Oct. 7, 1952        H. K. WIEMER        2,612,832
APPARATUS FOR FLAVOR TREATMENT OF CHOCOLATE
Original Filed Dec. 10, 1949
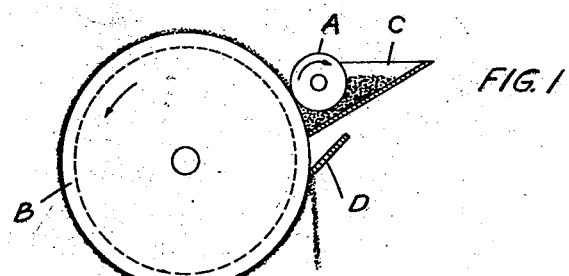
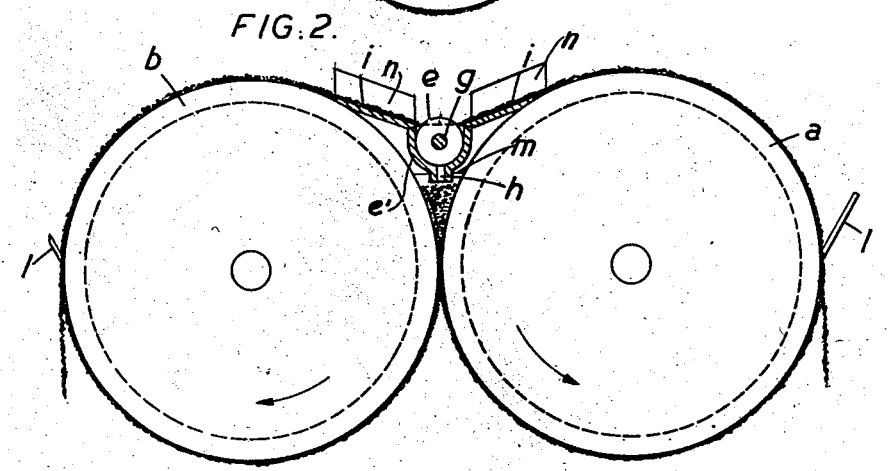
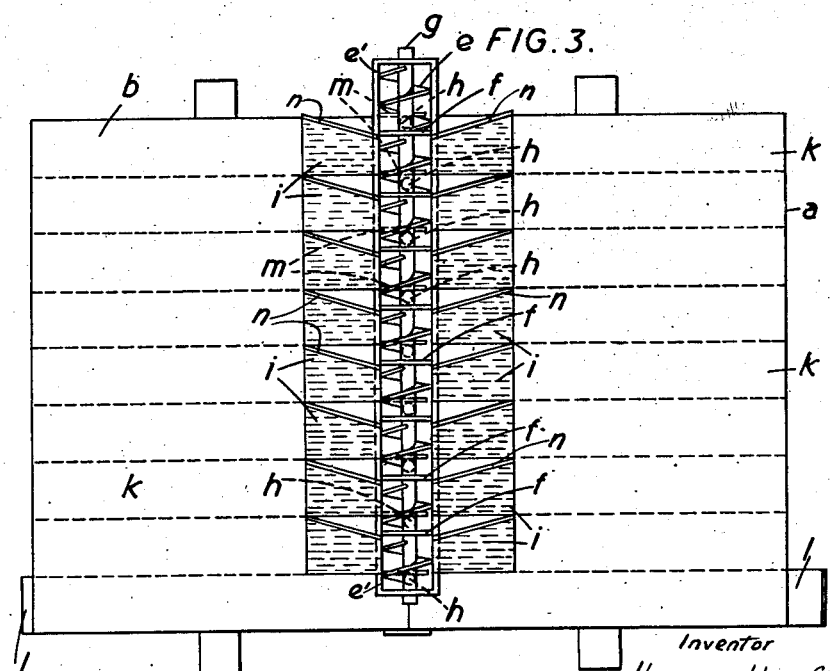
Inventor
Hermann Kurt Wiemer
By
Pennie, Edmonds, Morton and Barrows
Attorneys Patented Oct. 7, 1952

2,612,832

UNITED STATES PATENT OFFICE 2,612,832

APPARATUS FOR FLAVOR TREATMENT OF CHOCOLATE

Herman Kurt Wiemer, Wallington, England

Original application December 10, 1949, Serial No. 132,352. Divided and this application December 12, 1950, Serial No. 200,317. In Great Britain December 10, 1948

4 Claims. (Cl. 99—236)

1

This invention relates to apparatus for performing the process for the development of the flavor and improvement of chocolate forming the subject of United States patent application Serial No. 132,352, dated December 10, 1949, of which the present application is a division.

In former times chocolate was subjected in Swiss fondant machines or conches (longitudinal machines) to the special grinding process which is nowadays carried out in rolling mills while the old longitudinal machine is now used only for flavor improvement or ennoblement and development.

Although, due to the method of working, in a longitudinal machine, it is a matter of chance how often the particles of the mass are worked, i. e. how often they pass through the gap between the runner and the bed and come to the surface to give off certain gases, manufacturers still make use of the longitudinal machine in spite of its irrational method of operation because the chocolate produced in it has a particularly pleasant flavor.

It is understandable therefore that the problem of devising a machine which would operate economically and produce results equally as good as those obtainable by the longitudinal machine has engaged the attention of experts in the art. In the last 25 years many suggestions have been made which were based partly on different theories and it must be admitted that advances have been made, particularly as regards the saving of time, yet the efficiency of the longitudinal machine in improving the flavor has not been attained by such improvements and modern machines possess the same defect of the longitudinal machine that many particles of the mass are worked too much while others are worked too little.

The invention is directed to the solution of the problem of replacing the old longitudinal machine by a treatment of chocolate mass whereby the chocolate mass is improved in flavor in a continuous working process in a short time and each particle of the mass is subjected with certainty to one and the same treatment.

In order to provide a solution of the problem the operations in longitudinal machines were subjected to exact observation. It was found that during the working of the longitudinal machine the sugar particles of the mass were not substantially further reduced in size but the cocoa particles both in the grinding between the runner and the bed and also in the movement of the mass itself were so affected that they gave

2 off aromas with which the sugar and the cocoa-butter were enriched. As the working operation took place with a certain degree of heat a corresponding evaporation of ethereal constituents at the surface of the chocolate occurred, reducing the flavor of the chocolate in the course of the work to an unpleasant extent. In addition, a number of chemical reactions took place which need not here be further discussed.

In the best known longitudinal machine the tank holds about 200 kilograms of material, and the chocolate in the same had to be treated for about 72 hours so that the throughput per minute amounted to about 50 grams. The roller, the so-called runner of the longitudinal machine, rolls in a minute over about 20 square meters of surface while the machine has a steady evaporative surface of about 1 square meter which is changed about 60 times per minute.

Based on these observations an already ground chocolate mass again made soft must be subjected to a kneading and grinding operation in which the sugar particles have a grinding action on the cocoa particles but in which the sugar particles are not substantially reduced in size and that the chocolate mass must be exposed to the air for removal of the excess aroma and moisture. An ennobling or flavor-improving machine acts advantageously if care be taken in its construction to ensure that each particle is kneaded, ground and subjected to evaporation in like manner, and if the relation of grinding, kneading and evaporation to the output is that of a good longitudinal machine. In consequence it is possible to attain the result if the finely ground chocolate mass rendered soft is passed through longitudinally extending rolls the distance apart of which is greater than the grain size of the sugar and the chocolate mass is spread on a particularly large roll or rolls in a very thin layer and the path of the mass is such that all particulars are acted on in the same manner. Care must be taken that the chocolate spread on the surface of the rollers is given sufficient time for the volatile and ethereal particles and the evaporated moisture to escape. This surface and the time during which the mass is on this surface as well as the work between the rolls should be such as to correspond with the results obtained with longitudinal machines. In this way an apparatus can be provided which in a single passage through the machine produces masses of improved flavor and permits of continuous and thus economical working.

The invention thus consists in this that chocolate finished as regards reduction in size of the sugar grains and as regards mixing of sugar and cocoa as it comes from the refiner, after it is again softened, is applied to, one or both of a pair of heated rolls, the gap between which is somewhat greater than the sugar grains between which the cocoa particles are subjected to a regular grinding action, which rolls rotate very slowly and at least one of which has a large surface to which the chocolate is applied in a thin layer and in a single continuous passage whereby the chocolate gives up so much of the ethereal aroma materials that it acquires a pleasant mild character. The rolls are preferably heated electrically.

In one practical form of the apparatus the mass is desirably delivered to one end of a long roll which cooperates with a counter roll maintaining the desired size of gap and the mass is fed over the length of the roll by means of a screw conveyor or worm which is divided lengthwise so that a strip of the mass is fed in spires corresponding to the sub-divisions from one end of the roller to the other end. In this way the result is obtained that the mass is repeatedly fed through the gap between the rolls and spread on a suitably large surface. The rolls which are of particularly large dimensions have speeds of rotation which are much smaller than those in the rolling mills and the distance apart of the rolls is greater than the size of the sugar particles.

A machine is known in which both the grinding of the chocolate and the improvement in the flavor are carried out by means of one and the same rolling mill. This machine however possesses the faults of the longitudinal machine. It requires too much power since with every passage the power required is the same and it has the disadvantage of non-continuous working whereas the ideas underlying the present invention are based on knowledge of the operations taking place in the improvement of flavor in the longitudinal machine, according to which the grinding effect must be small and the possibility of evaporation must be great. It is understandable that only poor results could be obtained with such a known machine as in a rolling mill the grinding work is considerable and the possibility of evaporation is of minor importance.

For a clearer explanation of the invention two embodiments of apparatus suitable for the performance of the method are illustrated in the accompanying drawing, Fig. 1 illustrating diagramatically one embodiment and Figs. 2 and 3 showing another embodiment in side view partly in section and partly in plan respectively.

Referring to Fig. 1, chocolate prepared and rendered soft for example in the known grinding mechanism (refiners) is supplied by way of a hopper C to the flavor improving rolling mill which consists of the rolls A and B. The two rolls run at different speeds so that the mass is drawn into the gap between the rolls from the hopper. The speed differential between the rolls should not exceed 15%. This gap is so dimensioned that it just exceeds the grain size of the sugar particles in the chocolate mass.

In the single passage through the gap between the rolls the mass is spread in a thin layer on the surface of the rolls and due to the friction between the particles of cocoa mass and the sugar particles grinding of the cocoa mass particles takes place in the gap in the above described manner. By suitable dimensioning of the rolls a surface for the thin layer on the roll B is provided which travels at a speed based on experience in the working of the longitudinal machines.

In the manner above described a single passage of the mass takes place, all particles being subjected with certainty to the desired action and to one and the same treatment. By means of the scraper D the finished ennobled mass is removed from the roll B so that the ennobling operation takes place in a continuous manner and is complete. The device can when desired be connected direct to the refiner or to a mixer which serves to liquefy the mass.

In the arrangement illustrated in Figs. 2 and 3 the horizontal axes of the rolls $a$ and $b$ which in this form are of the same dimensions lie in the same horizontal plane. These rolls are of considerable length and above the gap between them is disposed a conveyor screw or worm $e$ in a casing $e'$ which is subdivided by intermediate partitions $f$ into separate chambers disposed in series in the longitudinal direction. The shaft $g$ of the conveyor screw extends through the casing $e'$ from one end to the other while the worm is sub-divided into portions structurally separate from one another and located respectively in the chambers of the series. Each of the divided chambers has at the bottom at the forward end of the corresponding worm an outlet opening $h$ for the chocolate mass. Adjacent each chamber except the first are arranged scrapers $i$ having side walls $n$ for directing the chocolate mass scraped off portions of the rolls $a$ and $b$ into such chambers.

When the mass is delivered at one end into the first chamber of the series it is fed through the corresponding bottom aperture $h$ on to the rolls $a$ and $b$ in the neighbourhood of the gap between the rolls which is divided by vertical division walls $m$ spaced apart a distance corresponding to the length of the chambers formed by the partitions $f$. In consequence the mass moves over a path $k$ corresponding to the length of the chamber on the rolls $a$ and $b$. It is finally scraped off by scrapers $i$ adjacent this path and fed into the next conveyor chamber by suitably inclining the scrapers $i$ and the side walls $n$ as shown in Fig. 3.

In this way the mass is advanced progressively lengthwise of the rolls, the mass being fed always in narrow strips through the gap between the rolls $a$ and $b$ which gap as already stated just exceeds the size of the sugar grains present in the mass. For example, the gap between the rolls may be between 50 and 300 microns depending on the desired flavor to be developed in the chocolate mass. In Fig. 3, the borders between adjacent paths $k$ or strips on the rolls $a$ and $b$ are indicated by the dotted lines thereon. In this way with considerable certainty the result is obtained that all particles of the mass are fed through the gap in the rolls and treated, the division into strips on the rolls providing the necessary extent of surface which is required for evaporation. When required or desired, a number of such rolling mills can be provided above one another, the mass then being removed from the rolls $a$ and $b$ by scrapers $l$.

As is known, the flavor of the chocolate mass is affected by the particles of iron ground off in the grinding operation, for example from chilled rollers, so that the flavor ennoblement is affected. In order to avoid this disadvantage, in accordance with a further feature of the invention the rolls for the rolling mill are made of a material which gives off particles which do not affect the taste. This material must naturally be hard so as to limit the particles given off to the minimum and being immune to attack by the acid constituents of the chocolate mass, and consists for example of hard porcelain, Carborundum or nickel-chrome steel.

I claim:

1. Apparatus for producing flavor development and improvement of chocolate from an already ground chocolate mass containing sugar in granular form comprising a pair of rolls, said rolls being mounted on horizontal parallel axes and spaced to provide a gap between them just exceeding the dimensions of the sugar grains in the mass, a longitudinally extending conveyor disposed above the gap between the rolls, said conveyor being subdivided into successive chambers each provided with a discharge outlet whereby chocolate mass delivered to said chambers is deposited on the rolls in strips, means for advancing the chocolate mass from the feed end of the rolls to the other end, said means comprising a scraper having a scraping edge in contact with a roll at the position of each strip on the roll deposited from said chambers and having a delivery edge for delivering chocolate into a succeeding chamber, and scraping means disposed to contact the rolls adjacent said other end for removing the chocolate therefrom.

2. Apparatus for producing flavor development and improvement of chocolate from an already ground chocolate mass containing sugar in granular form as claimed in claim 1 characterized by this that the rolls are made of hard material immune to attack by the acid constituents of the chocolate, said material being selected from the group of materials consisting of porcelain, Carborundum and nickel-chrome steel.

3. An apparatus for developing the flavor of a preground chocolate mass containing sugar in granular form, comprising a pair of rotatable parallel rolls arranged horizontally and slightly spaced apart to provide a gap therebetween just exceeding the dimensions of the sugar grains in the chocolate mass, a conveyor casing disposed above the gap between the rolls and extending longitudinally of the rolls, said casing being subdivided into a series of successive chambers, the first of which is adapted to receive the chocolate mass to be processed, each chamber having a discharge outlet directed toward the gap between the rolls and located at its end adjacent the next succeeding chamber whereby chocolate mass delivered to said chambers is deposited on the rolls as a series of strips, means including a scraper having a scraping edge engaging with a roll at the position of each strip except the last and having a delivery edge for delivering chocolate removed from said strip into the chamber for the next succeeding strip of the series, means in each chamber for advancing chocolate delivered thereinto toward the outlet therefor, and means located at the position of the last strip of the series of chocolate strips on the rolls for removing the chocolate therefrom.

4. An apparatus for developing the flavor of a preground chocolate mass containing sugar in granular form, comprising a pair of rotatable parallel rolls arranged horizontally and slightly spaced apart to provide a gap therebetween just exceeding the dimensions of the sugar grains in the chocolate mass, means disposed above the gap between the rolls at one end thereof for feeding chocolate into the gap and onto said end of said rolls whereby a strip of chocolate is applied to the feed end portion of each roll, a series of parallel scrapers extending from the feed end of the rolls longitudinally thereof, each scraper having a scraping edge engaging with a longitudinal portion of a roll for scraping a strip of chocolate therefrom and having a delivery edge for delivering chocolate removed from said roll portion, means for conducting the chocolate delivered by each scraper into the gap between the rolls at the position of the next succeeding scraper in the series, whereby chocolate delivered to the feed end of the rolls is applied to the rolls as a succession of strips in advancing longitudinally of said rolls.

HERMAN KÜRT WIEMER.

REFERENCES CITED

The following references are of record in the file of this patent:

UNITED STATES PATENTS

| Number | Name | Date |
| --- | --- | --- |
| 153,190 | Cushman | July 21, 1874 |
| 216,553 | Braun | June 17, 1879 |
| 1,033,737 | Schwartz et al. | July 23, 1912 |
| 1,512,466 | Iff | Oct. 21, 1924 |
| 1,766,447 | Moir | June 24, 1930 |
| 1,777,605 | Dimler | Oct. 7, 1930 |
| 2,097,709 | Walters | Nov. 2, 1937 |
| 2,319,040 | Conklin | May 11, 1943 |
| 2,478,885 | Alvey | Aug. 9, 1949 |